(12) United States Patent
Matsuto et al.

(10) Patent No.: US 6,276,481 B1
(45) Date of Patent: Aug. 21, 2001

(54) POWER UNIT ARRANGEMENT STRUCTURE FOR MOTORCYCLE

(75) Inventors: Takushi Matsuto; Kaoru Wachigai, both of Saitama-Ken (JP)

(73) Assignee: Honda Giken Kogyo Kubushiki Kaisha, Tokyo (JP)

( * ) Notice: Subject to any disclaimer, the term of this patent is extended or adjusted under 35 U.S.C. 154(b) by 0 days.

(21) Appl. No.: 09/486,324

(22) PCT Filed: Sep. 8, 1998

(86) PCT No.: PCT/JP98/04018

§ 371 Date: Feb. 25, 2000

§ 102(e) Date: Feb. 25, 2000

(87) PCT Pub. No.: WO99/14108

PCT Pub. Date: Mar. 25, 1999

(30) Foreign Application Priority Data

Sep. 14, 1997 (JP) .................................................. 9-268074

(51) Int. Cl.[7] .................................................... B62M 7/00
(52) U.S. Cl. .......................... 180/220; 180/226; 180/65.2
(58) Field of Search .................................. 180/220, 226, 180/227, 228, 230, 65.1, 65.2, 65.3, 65.4

(56) References Cited

U.S. PATENT DOCUMENTS

| 1,378,309 | * | 5/1921 | Amiot ................................ 180/226 |
| 2,316,477 | * | 4/1943 | Weaver .............................. 180/226 |
| 4,214,644 | * | 7/1980 | Matsuda ............................. 180/226 |
| 4,388,979 | * | 6/1983 | Fritzenwenger .................... 180/226 |
| 4,697,664 |   | 10/1987 | Kohyama . |
| 5,024,113 | * | 6/1991 | Ito et al. ............................ 180/219 |
| 5,501,292 | * | 3/1996 | Kawashima et al. .............. 180/65.1 |
| 5,581,136 | * | 12/1996 | Li ..................................... 180/220 |
| 6,109,383 | * | 8/2000 | Matsuto et al. ................... 180/226 |

FOREIGN PATENT DOCUMENTS

| 60092929 | 5/1985 | (EP) . |
| 08175477 | 9/1996 | (EP) . |
| 800488 | 8/1958 | (GB) . |

* cited by examiner

Primary Examiner—Douglas Hess
Assistant Examiner—Elaine Gort
(74) Attorney, Agent, or Firm—Merchant & Gould P.C.

(57) ABSTRACT

In a motorcycle power unit, a crank shaft (56) and a clutch shaft (57) disposed on the right side (in the figure) from a body center (127) and a cylinder head (129H) is disposed on the left side from the body center (127). Since the crank shaft, the clutch shaft and a transmission shaft are disposed on one of right and left sides with respect to the body center and the cylinder is disposed on the other side with respect to the body center, it becomes possible to make a favorable lateral balance of the power unit.

3 Claims, 8 Drawing Sheets

POWER UNIT ARRANGEMENT STRUCTURE FOR MOTORCYCLE

TECHNICAL FIELD

The present invention relates to a power unit arrangement structure for a motorcycle, and particularly to a power unit arrangement structure suitable for a hybrid type motorcycle including an electric motor in addition to an engine.

BACKGROUND ART

Vehicles of a type using gasoline engine as a drive source are mainly available; however, vehicles of a type using an electric motor as a drive source are required at locations where occurrence of exhaust gas must be avoided. A motor-driven vehicle, however, has an inconvenience in the increased body weight and the shortened running distance. To cope with such an inconvenience, it has been increasingly required to develop a hybrid type vehicle including an electric motor in addition to an engine.

For example, Japanese Patent Laid-open No. HEI-8-175477 discloses a hybrid type motorcycle entitled "DEVICE FOR SWITCHING ENGINE POWER TO/FROM MOTOR POWER IN MOTORCYCLE OR THE LIKE".

As shown in FIG. 2 of the above document, although a piston and a cylinder are disposed along the center of a rear wheel 37 in the width direction of the vehicular body, main parts such as a transmission case 12 and a belt type transmission are disposed on the left side (as seen from a passenger) with respect to the center of the rear wheel 37, and further a motor 22 shown in FIG. 3 of the above document is disposed at a position largely shifted leftward from the center of the rear wheel.

That is to say, in the related art power unit, it is expected to take a lateral weight balance thereof.

DISCLOSURE OF THE INVENTION

It is therefore an object of the present invention to provide a power unit arrangement structure capable of solving a lateral imbalance of a power unit.

To achieve the above object, according to the present invention, there is provided a power unit arrangement structure for a motorcycle, in which a power transmission system for transmitting power of an engine is disposable on one side of a rear wheel of the motorcycle, an engine is disposed with a crank shaft extending in a longitudinal direction, the crank shaft and the power transmission system are disposable on one side with respect to a longitudinal center of a motorcycle body, and a cylinder head of the engine extends on the other side with respect to the longitudinal body center, characterized in that a power transmission shaft is disposed parallel to and higher than the crank shaft.

Since the crank shaft and the power transmission system are disposed on one side and the cylinder head is disposed on the other side, it is possible to improve the weight balance of the power unit, and hence to ensure a favorable steering stability of the motorcycle.

According to a further aspect of the invention, the cylinder head is a cylinder head of a four cycle engine.

Since the crank shaft and the power transmission system are disposed on one side and the cylinder head including a valve drive mechanism is disposed on the other side, it is possible to improve the weight balance of the power unit, and hence to ensure a favorable steering stability of the motorcycle.

According to a still further aspect of the invention, the power transmission system includes a power transmission system for transmitting a power of an electric motor.

Since the power transmission system including the electric motor and the crank shaft are disposed on one side and the cylinder head is disposed on the other side, it is possible to improve the weight balance of the power unit, and hence to ensure a favorable steering stability of the motorcycle.

According to a still further aspect of the invention, members of an intake system and members of an exhaust system are disposed on the cylinder head side.

Since the crank shaft and the power transmission system are disposed on one side, and the cylinder head and members of the intake and exhaust system are disposed on the other side, it is possible to improve the weight balance of the power unit, and hence to ensure a favorable steering stability of the motorcycle.

BRIEF DESCRIPTION OF THE DRAWINGS

A preferred embodiment of the present invention will be described in detail below, by way of example only, with reference to the accompanying drawings, in which.

BEST MODE FOR CARRYING OUT THE INVENTION

Figure 1:
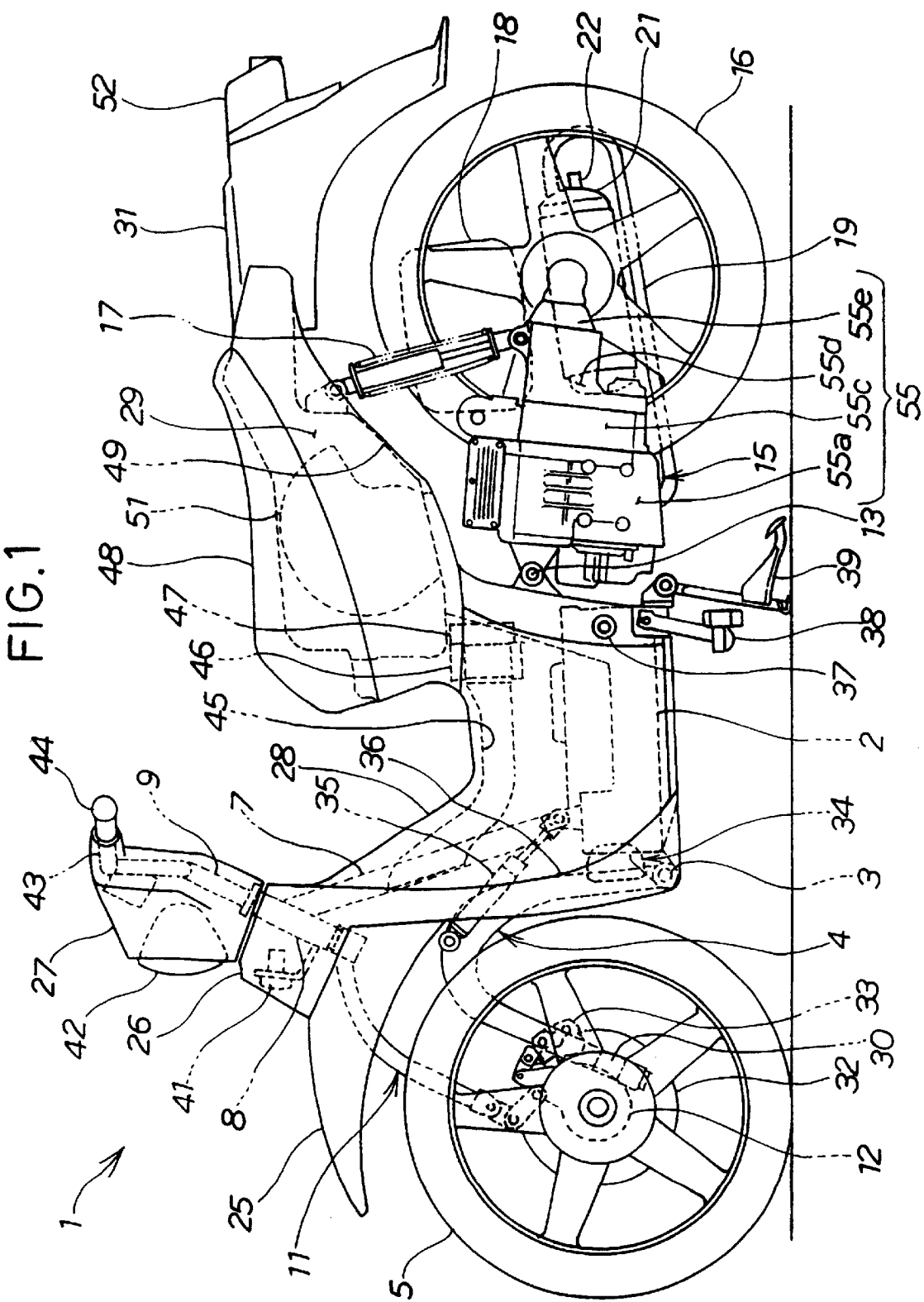
FIG. 1 is a side view of a motorcycle according to the present invention.

Hereinafter, an embodiment of the present invention will be described with reference to the accompanying drawings. It is to be noted that the drawings should be seen in the direction of reference numerals.

FIG. 1 is a side view of a motorcycle according to the present invention.

Referring to FIG. 1, a motorcycle 1 has at its lower central portion a box-like main frame 2 serving as a battery containing box. Inverse U-shaped front swing arms 4 extend from a lower front portion of the main frame 2 through a front pivot 3, and a front wheel 5 is rotatably mounted on the front swing arms 4. A head pipe post 7 extends obliquely upward from an upper front portion of the main frame 2 and a head pipe 8 is fixed at a leading end of the head pipe post 7. A handle post 9 is rotatably mounted in the head pipe 8, and a steering arm 11 is mounted on a lower end of the handle post 9. A leading end (lower end) of the steering arm 11 is connected to a knuckle 12 mounted on the front wheel 5. A power unit 15 is swingably mounted on an upper rear portion of the main frame 2 through a rear pivot 13 functioning as a swing shaft. A rear wheel 16 is mounted on the power unit 15. A rear cushion 17 is disposed in front of the rear wheel 16, and an air cleaner 18, an exhaust pipe 19, a muffler 21, and a tail lamp 22 are disposed behind the rear wheel 16. A vehicular body includes a front fender 25, a front cover 26, a front handle cover 27, a center cowl 28, a rear cowl 29 and a rear fender 31 which are disposed in this order from the front side to the rear side of the vehicular body.

In FIG. 1, reference numeral 30 indicates a stem; 32 is a front brake disk; 33 is a caliper; 34 is a resin spring; 35 is a front damper; 36 is a leg shield; 37 is a passenger's step; 38 is a side stand; and 39 is a main stand. On an upper side of FIG. 1, reference numeral 41 indicates a horn; 42 is a front lamp; 43 is a handlebar; 44 is a grip; 45 is a baffle duct; 46 is a radiator; 47 is a fan; 48 is a sheet; 49 is a helmet box; 51 is a helmet; 52 is a tail lamp; and 55 is a power unit case.

The power unit case 55 is composed of right and left crank cases 55b and 55a (the right crank case 55b on the back side of the figure is not shown), a transmission case 55c, an electric motor case 55d, and a reduction gear case 55e.

Figure 2:
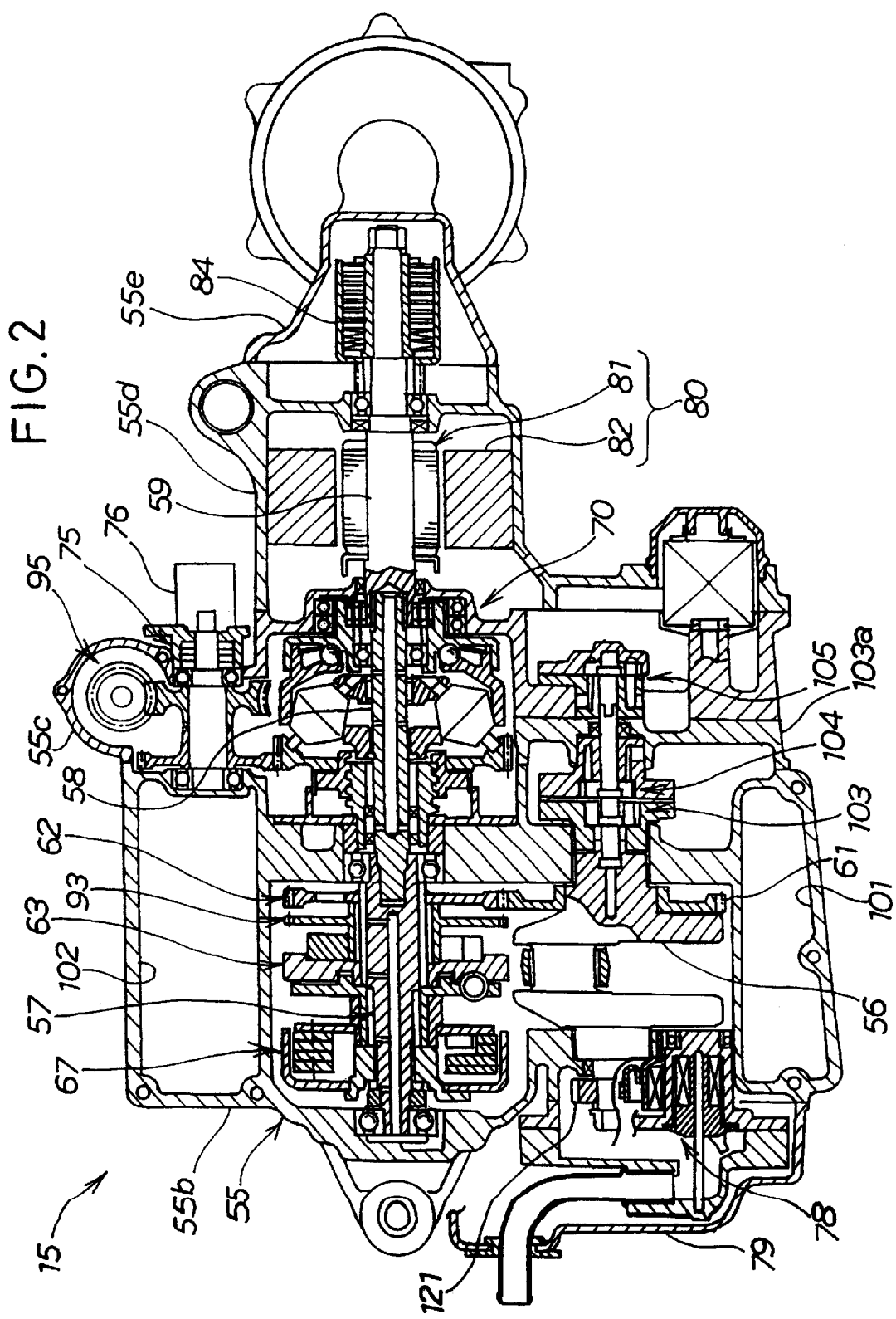
FIG. 2 is a sectional side view of a power unit according to the present invention.

FIG. 2 is a sectional side view of the power unit according to the present invention.

As will be fully described with reference to FIG. 8, the power unit 15 includes a four-cycle engine in which an intake cam shaft and an exhaust cam shaft are provided in a cylinder head. The power unit 15 has a crank shaft 56 disposed in a lower portion of the power unit case 55; a clutch shaft 57 disposed in parallel to and higher than the crank shaft 56; and a transmission shaft 58 and an electric motor shaft 59 disposed in such a manner as to extend from one end of the clutch shaft 57 in the longitudinal direction (fore and aft) of the vehicular body. That is to say, the clutch shaft 57, transmission shaft 58, and electric motor shaft 59 are disposed in series and also in parallel to and higher than the crank shaft 56.

Since the clutch shaft 57, transmission shaft 58, and electric motor shaft 59 are disposed in series in the longitudinal direction of the vehicular body, the direction of a force applied to the power unit case 55 becomes simple. This facilitates the design of the power unit case 55. Concretely, the power unit case 55 can be designed such that the rigidity is high in the direction where the force is applied and the rigidity is low in the direction where the force is not applied; and consequently, the power unit case 55 can be reduced in weight and also be made compact as a whole in proportional to simplification of the force applied to the power unit case 55.

In FIG. 2, reference numeral 75 indicates an epicycle reduction gear; 76 is a potentiometer for detecting a rotational angle of a transmission control motor 95 to be described later; 121 is a cam shaft drive pulley; 78 is a water pump driven by the pulley 121; 79 is a belt cover; and 103a is an oil pump case disposed at a lower central portion of the figure.

A primary drive gear 61, a primary driven gear 62, a centrifugal clutch 67, and a transmission 70, (which are further added with an electric motor shaft 59 when the electric motor 80 is operated for assisting the engine power), constitutes a power transmission system for transmitting power from the engine; and the electric motor shaft 59 when the electric motor 80 is operated constitutes a power transmission system for transmitting power from the electric motor.

The details of components associated with the clutch shaft 57, transmission shaft 58, and electric motor shaft 59 will be fully described with reference to the following figure.

Figure 3:
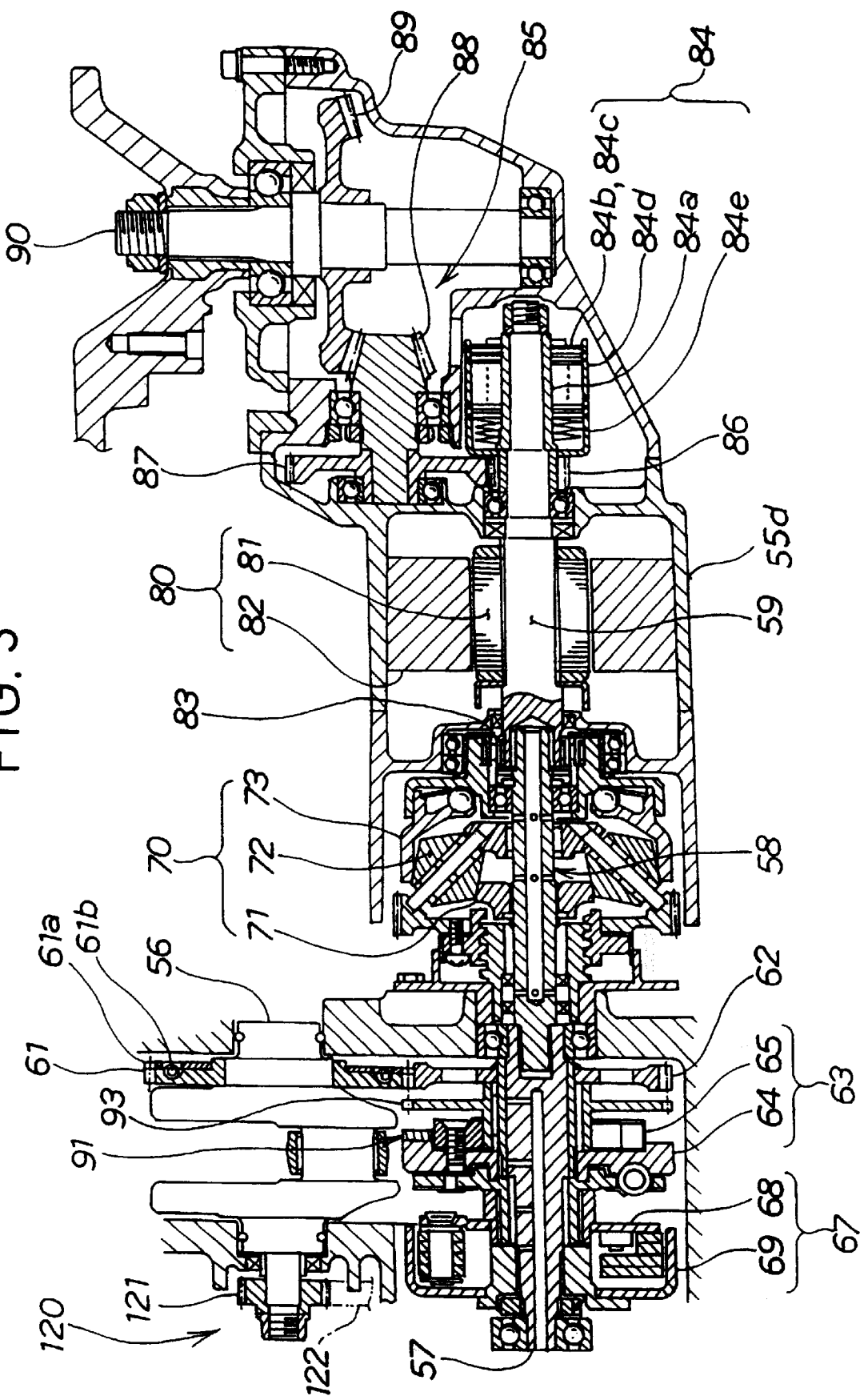
FIG. 3 is a sectional plan view of the power unit according to the present invention.

FIG. 3 is a sectional plan view of the power unit according to the present invention. The details of the components associated with the clutch shaft, transmission shaft, and electric motor shaft, and the drive force transmission configuration will be described with reference to this figure.

The primary driven gear 62 rotatably mounted on the clutch shaft 57 is driven by the primary drive gear 61 mounted on the crank shaft 56. The primary driven gear 62 drives a clutch outer 64 of a one-way clutch 63 for a starter and a clutch inner 68 of the centrifugal clutch 67 independently from the clutch shaft 57. For this purpose, the primary driven gear 62 is connectable to both the clutch outer 64 of the one-way clutch 63 and the clutch inner 68 of the centrifugal clutch 67 by means of a cylindrical member. As the centrifugal clutch inner 68 is rotated at a rotational speed of a specific value or more, a centrifugal clutch outer 69 is rotated together with the centrifugal clutch inner 68, with a result that the clutch shaft 57 starts to be rotated The above primary drive gear 61 includes a phase difference adjusting sub-gear 61a and a spring 61b for preventing occurrence of gear rattle.

The transmission 70, which is of a cone type with its function fully described with reference to another figure, transmits a power in the order of the transmission shaft 58 → an inner disk 71 → cone 72 → an outer cup 73. The rotation of the outer cup 73 is transmitted to the electric motor shaft 59 through a one-way clutch 83.

The electric motor 80 is of a coreless type, in which a permanent magnet type rotor 81 is mounted on the electric motor shaft 59 and a stator coil 82 is mounted on an electric motor case 55d.

When the centrifugal clutch 67 is turned on, a drive force is transmitted in the order of the clutch shaft 57, transmission shaft 58, transmission 70, and electric motor shaft 59, and acts to drive an axle 90 through a multi-disk type torque limiter 84 and a reduction gear mechanism 85 (which is composed of a small gear 86, a large gear 87, a small gear 88, and a large gear 89).

The multi-disk type torque limiter 84 includes a limiter inner 84a rotated together with the electric motor shaft 59, disks 84b and 84c (the disk 84b is mounted on the limiter inner 84a and the disk 84c is mounted on the following limiter outer 84d), a limiter outer 84d, and a spring 84e. The small gear 86 is integrated with the limiter outer 84d.

Power is transmitted in the order of the limiter inner 84 → disk 84b → disk 84c → limiter outer 84d → small gear 86. If an excess torque over a predetermined value is applied, there occurs a slip between the disks 84b and 84c for protecting the components of the multi-disk torque limiter 84. The predetermined torque can be set by the spring 84e.

The one-way clutch outer 64 for a starter acts as a flywheel and has a balance weight 91 for taking an engine balance. The one-way clutch outer 64 constitutes the one-way clutch 63 for transmitting rotation of a starter in combination with the one-way clutch inner 65.

When a starter driven gear 93 is rotated by a starter (not shown), the centrifugal clutch inner 68 is rotated through the one-way cutch inner 65 and the one-way clutch outer 64, to start operation of the engine. And, when the one-way clutch outer 64 is rotated at a higher speed, it is separated from the clutch inner 65 on the low speed side.

In FIG. 3, the cam shaft drive pulley 121 for driving a cam shaft or the like is provided on the other end (from end) of the crank shaft 56. A belt 122 is driven by the pulley 121. The details of the pulley 121 and the belt 122 will be fully described later.

Figure 4:
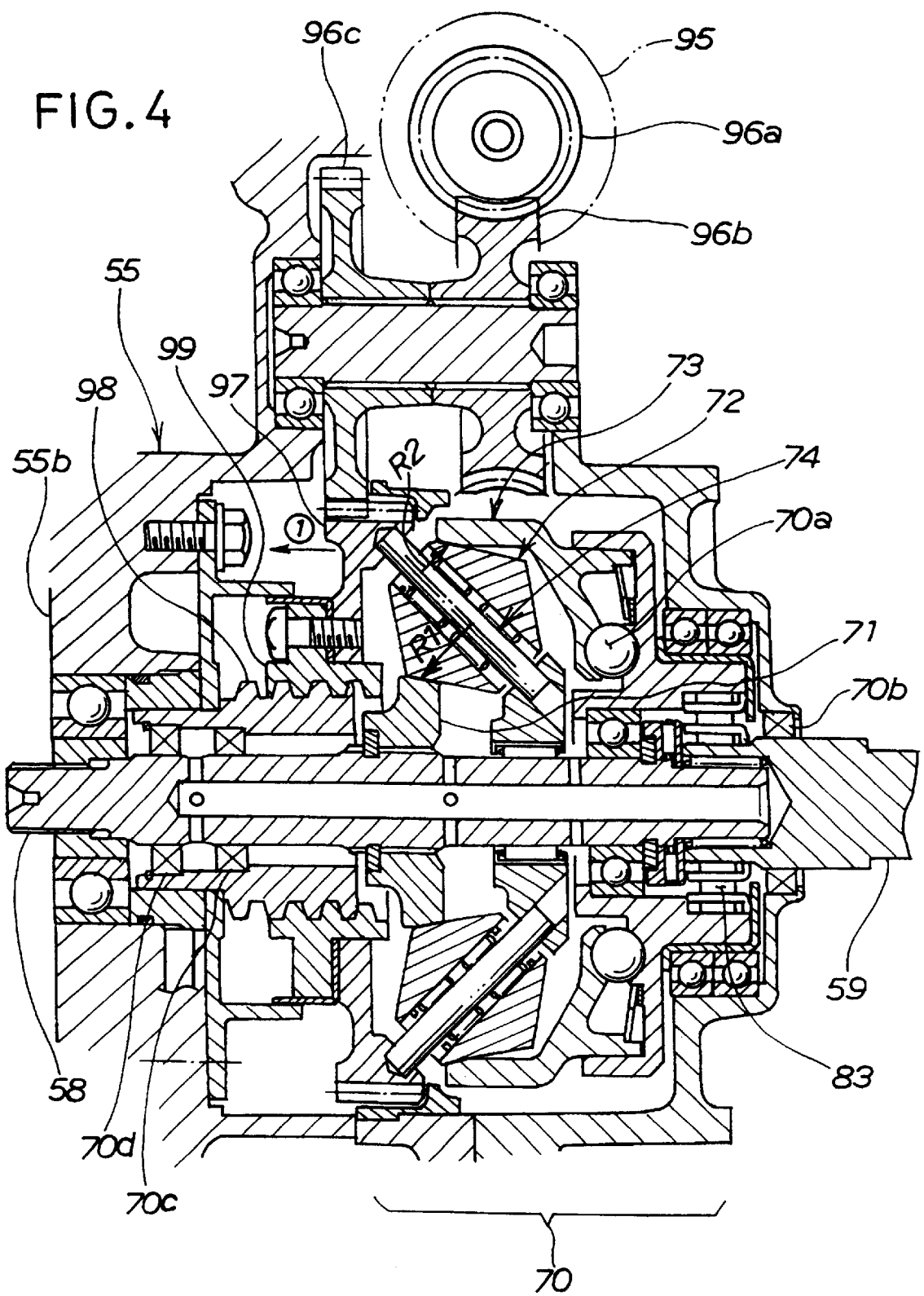
FIG. 4 is a view showing a configuration and a function of a cone type continuously variable transmission according to the present invention.
Figure 5:
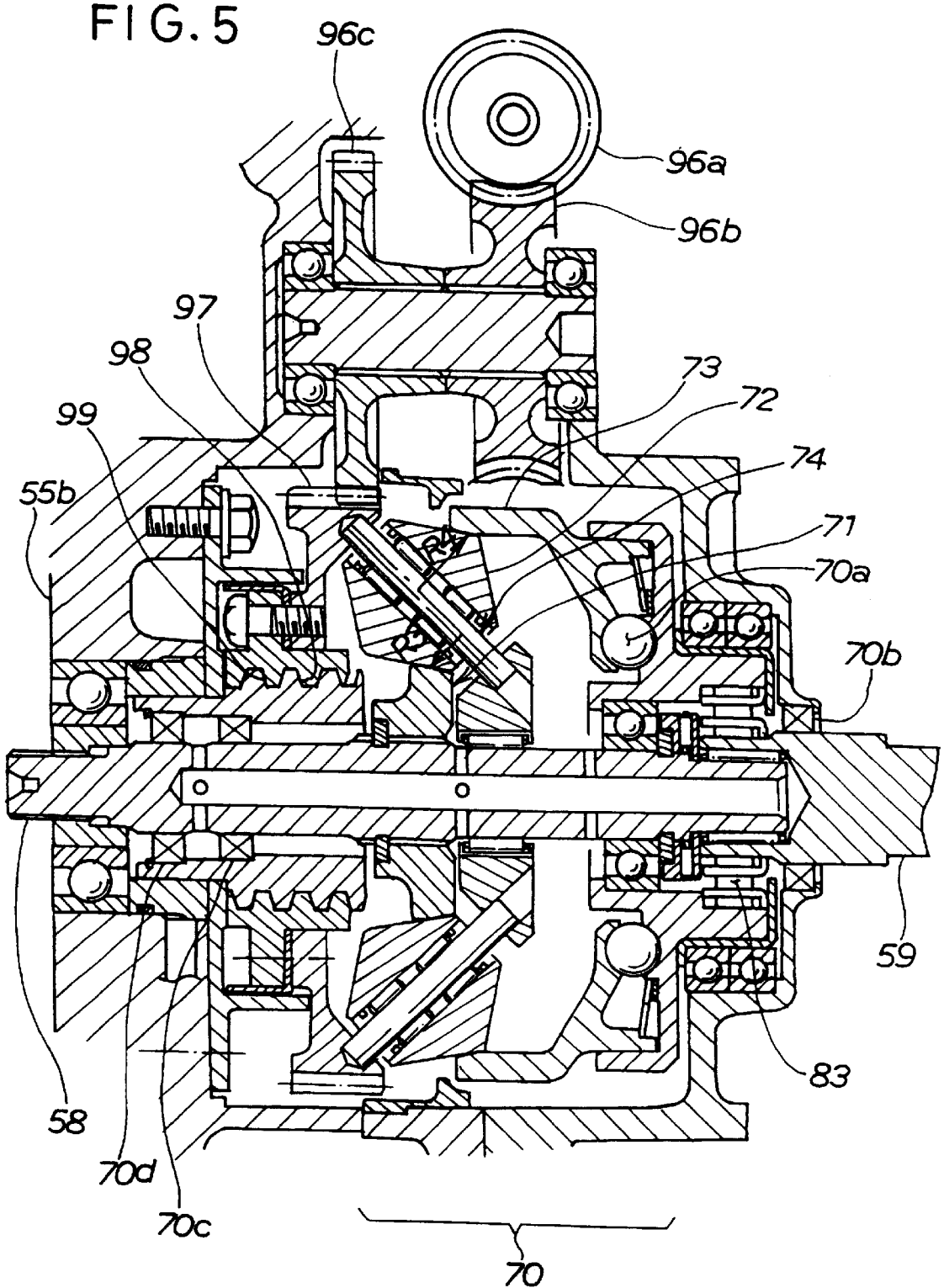
FIG. 5 is a view showing a configuration and a function of the cone type continuously variable transmission according to the present invention.

FIGS. 4 and 5 are views illustrating configuration and a function of the cone type continuously variable transmission according to the present invention.

In the state of the cone 72 shown in FIG. 4, a relationship of R1>R2 is given, where R1 is a distance from the center of a cone supporting shaft 74 to the inner disk 71, that is, a rotational radius of the inner disk 71, and R2 is a distance from the center of a core supporting shaft 74 to the outer cup 73, that is, a rotational radius of the outer cup 73.

The cone 72 is rotated at a low speed because a large diameter portion (radius: R1) of the cone 72 is rotated by the inner disk 71, and the outer cup 73 is rotated at a low speed because the outer cup 73 is rotated by the small diameter portion (radius: R2) of the cone 72.

When rotation of the outer cup 73 is higher than that of the electric motor shaft 59, power is transmitted from the outer cup 73 to the electric motor shaft 59 through the one-way clutch 83.

Reference numeral 70a indicates a cam ball for pushing the outer cup 73 leftward along with rotation of the outer cup 73. Such a pushing action allows contact pressure to be applied between the outer cup 73 and the cone 72. Reference numerals 70b, 70c and 70d indicate oil seals. The oil seals 70b and 70c form a closed space for accumulating transmission oil in the transmission 70, and the oil seal 70d cuts off oil on the crank case 55b side (on the left side of the figure). Accordingly, there is no fear that oil in the crank case is mixed with transmission oil.

In the state of the cone 72 shown in FIG. 5, a relationship of R3<R4 is given, where R3 is a distance from the center of the cone supporting shaft 74 to the inner disk 71, that is, a rotational radius of the inner disk 71, and R4 is a distance from the cone supporting shaft 74 to the outer cup 73, that is, a rotational radius of the outer cup 73.

The cone 72 is rotated at a high speed because the small diameter portion (radius: R3) of the cone 72 is rotated by the inner disk 71, and the outer cup 73 is rotated at a high speed because the outer cup 73 is rotated by the large diameter portion (radius: R4) of the cone 72.

By moving the cone 72 as shown in FIGS. 4 and 5, the transmission 70 transmits rotation at a reduced speed, a uniform speed, or an increased speed.

For this purpose, as shown in FIG. 4, a control gear 97 is shifted by the transmission control motor 95 through gears 96a, 96b and 96c. The control gear 97 has a trapezoid female thread portion 99 formed on its boss portion. The trapezoid female thread portion 99 is meshed with a trapezoid male thread portion 98 fixed on the case 55 side. The control gear 97 is shifted leftward in the figure by spiral motion of the trapezoid female thread portion 99. The leftward shift of the control gear 97 moves the cone 72 leftward in the figure together with the cone supporting shaft 74 into the state shown in FIG. 5.

It is important that both the trapezoid male thread portion 98 and the trapezoid female thread portion 99 are provided not on the outer cup 73 side but on the inner disk 71 side. The cone 72 is pushed leftward in the figure by reaction of the outer cup 73. As a result, the control gear 97 is applied with a force in the direction shown by an arrow "1", that is, in the direction from the low speed side to the high speed side. With the configuration in this embodiment, the cone 72 can be shifted to the high speed side with a small torque. This is effective to lower the capacity of the transmission control motor 95.

A lubricating system will be described below.

Figure 6:
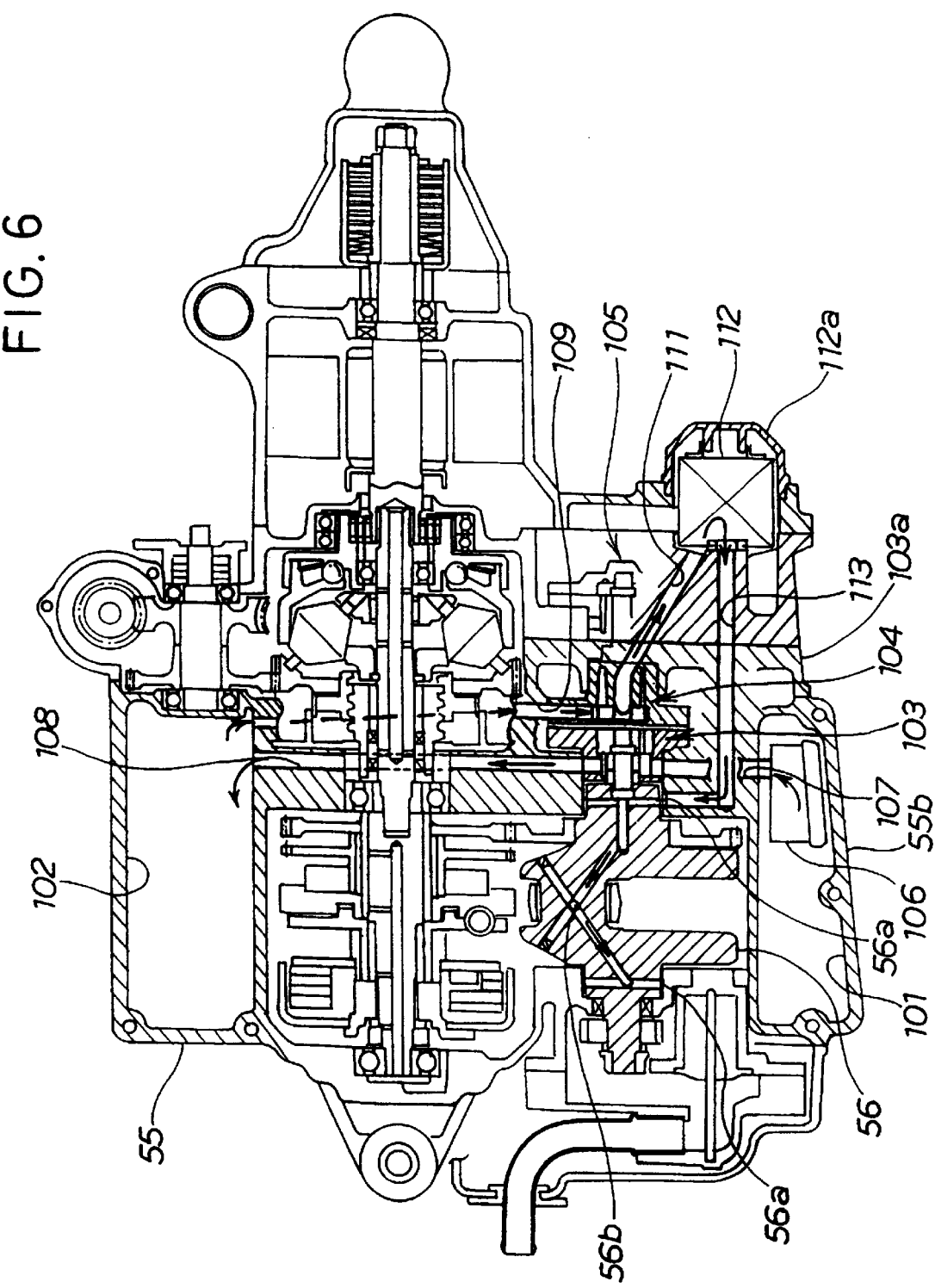
FIG. 6 is a view illustrating an engine lubricating system according to the present invention.

FIG. 6 is a view illustrating an engine lubricating system according to the present invention, in which flow of oil is indicated by an arrow.

The power unit case 55 has a lower oil tank 101 disposed at its lower portion, and an upper oil tank 102 disposed at its upper portion. A first oil pump 103, a second oil pump 104, and a third oil pump 105 are coaxially disposed on one end side (right end side) of the crank shaft 56. First, oil in the lower oil tank 101 is pumped by the first oil pump 103 through a strainer 106 and a first oil passage 107, and is supplied to the upper oil tank 102 through a second oil passage 108.

The oil in the upper oil tank 102 flows to the second oil pump 104 through a third oil passage 109 and is pressurized by the second oil pump 104. The oil thus pressurized lubricates main journal portion 56a, a connecting rod large end portion 56b, and others (particularly, a valve chamber not shown) through a fourth oil passage 111, a filter 112, and a fifth oil passage 113, and returns to the lower oil tank 101. In this figure, reference numeral 112a indicates a filter cover.

Figure 7:
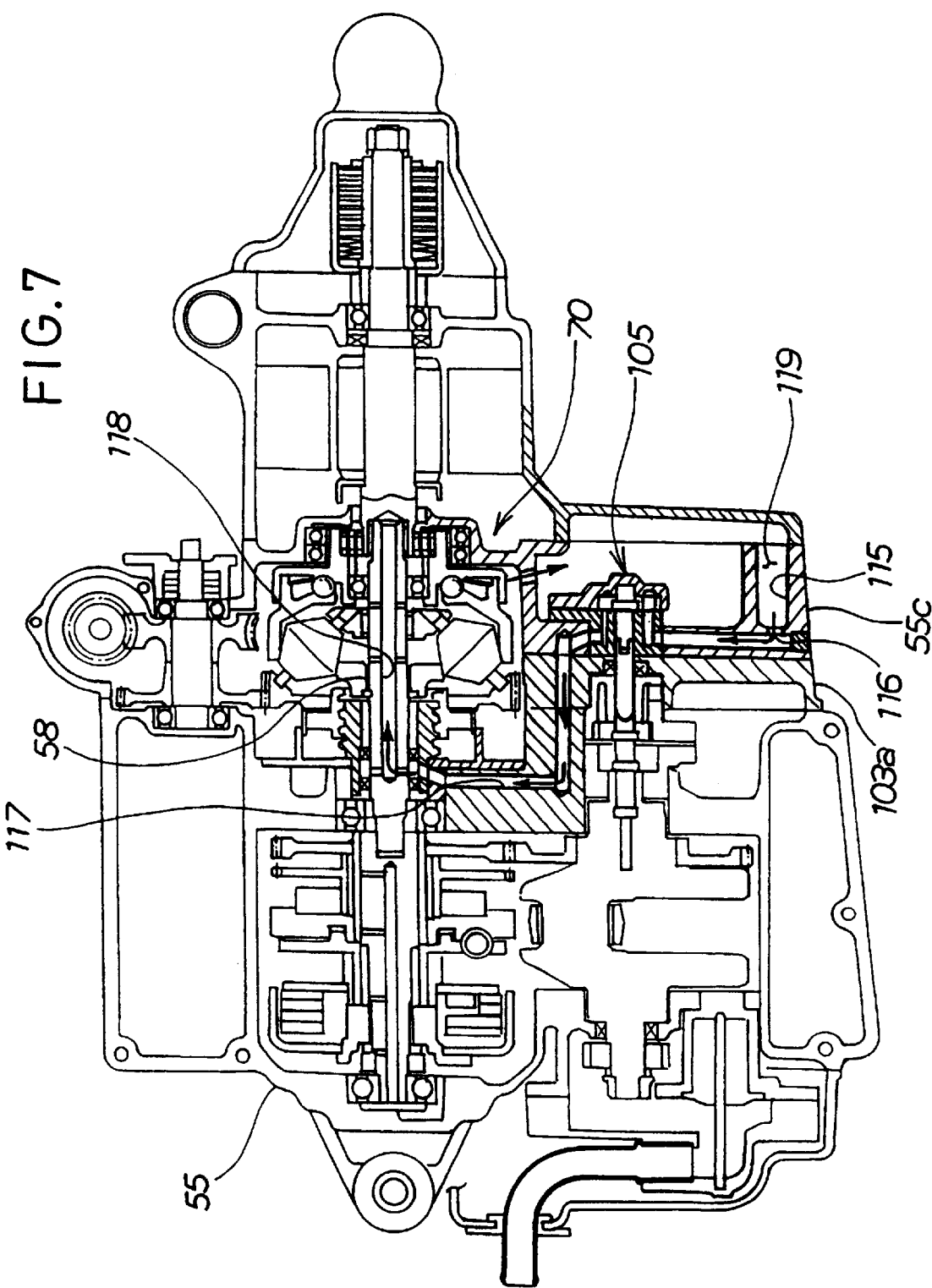
FIG. 7 is a view illustrating a transmission lubricating system according to the present invention.

FIG. 7 is a view illustrating a transmission lubricating system according to the present invention. Referring to FIG. 7, transmission oil is pumped from a transmission oil tank 115 additionally provided on a lower portion of the power unit case 55 by the third oil pump 105 through a six oil passage 116, being fed to the transmission shaft 58 through a seventh oil passage 117, and is supplied to the transmission 70 through an oil passage 118 in the transmission shaft 58. The oil is then returned to the transmission oil tank 115 in the direction shown by an arrow in the figure, and is pumped by the third oil pump 105 through a strainer 119.

Figure 8:
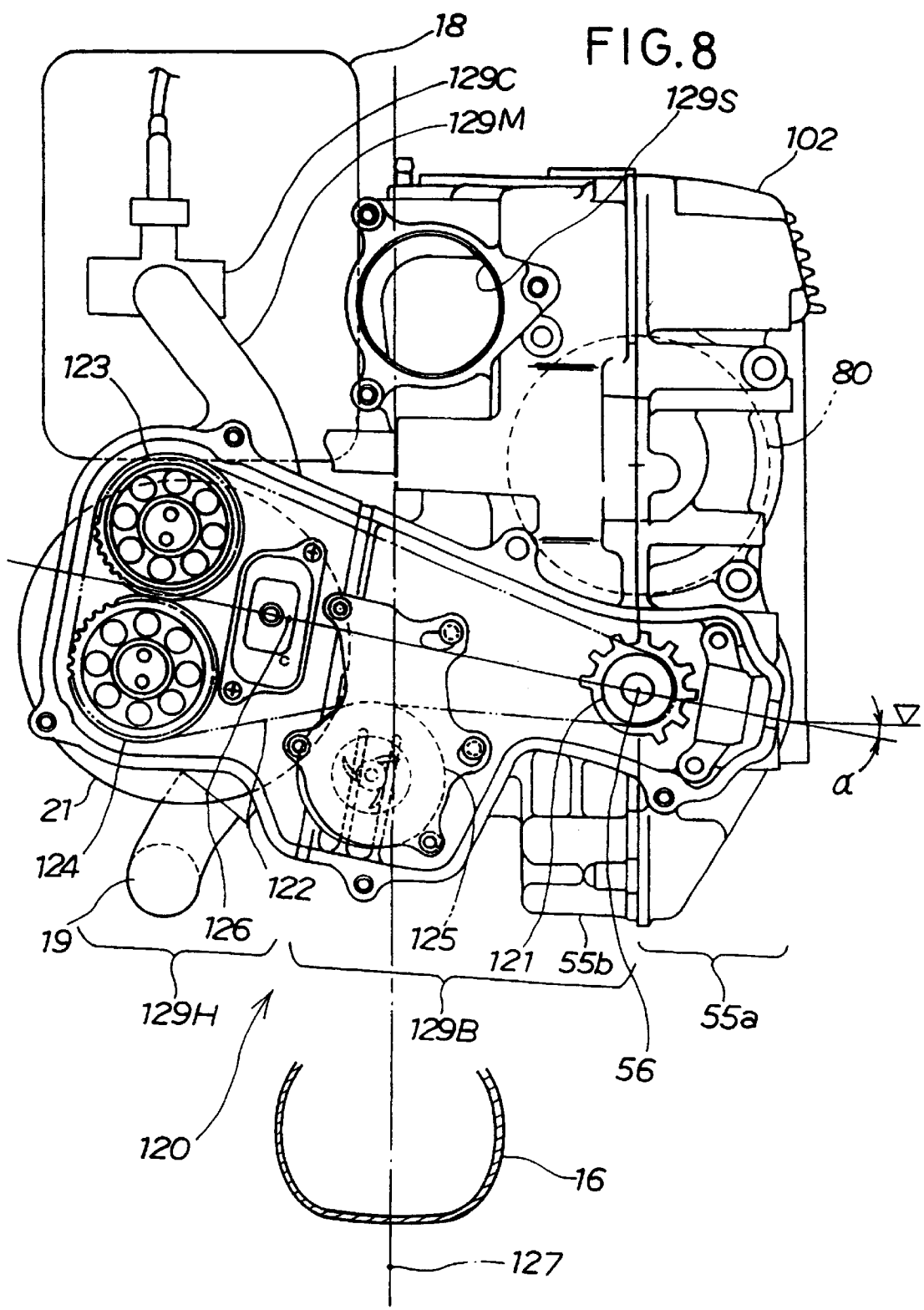
FIG. 8 is a front view of the power unit, showing a cam shaft drive mechanism as a valve drive mechanism according to the present invention.

FIG. 8 is a front view of the power unit, showing a cam shaft drive mechanism as a valve drive mechanism according to the present invention.

Referring to FIG. 8, the left crank case 55a is mounted on the right side of a cylinder block 129B integrated with the right crank case 55b, and the electric motor 80 is disposed higher than the crank shaft 56. A cylinder head 129H is mounted on the left side of the cylinder block 129B. The muffler 21 is mounted at the leading end of the exhaust pipe 19 extending from the cylinder head 129H. An intake manifold 129M extending from the air cleaner 18 on the upper left side (and on the back side of the figure) is connected to the cylinder head 129H through a carburetor 129C. Reference numeral 129S indicates a starter motor mounting hole.

In FIG. 8, since a belt cover 79 is removed, there can be seen, from the front side of the power unit 15, a cam shaft drive mechanism 120 as the valve drive mechanism composed of a cam shaft drive pulley 121, a belt 122, an intake side cam shaft pulley 123, an exhaust side cam shaft pulley 124, and a tensioner 125.

As is apparent from FIG. 8, since the cylinder is disposed in the width direction of the vehicular body with its cylinder axis 126 substantially in the horizontal direction (for example, a tilt angle with respect to the ground is set at +10°), the center of gravity of the vehicle is lowered and also the cylinder length can be set within the vehicular width. This increases the degree of design of the vehicle.

In FIG. 8, which is seen in the direction from the front wheel side to the rear wheel side, both the crank shaft 56 and the clutch shaft 57 are disposed on the right side from a body center 127, and the cylinder head 129H is disposed on the left side from the body center 127. Behind the clutch shaft 57 in the figure are disposed the shafts of "the power transmission system" such as the transmission shaft 58 and the electric motor shaft 59, as described with reference to FIGS. 2 and 3.

Referring to FIG. 8, the cylinder head 129H including two cam shafts (not shown) and the like is sufficiently heavy and acts as a counter weight which is balanced with the power unit case 55, disposed on the right side of the figure, including the crank shaft 56, clutch shaft 57, and the like. Accordingly, it is possible to easily solve the lateral imbalance.

The power unit 15 in this embodiment includes the electric motor 80 in addition to the engines and since the crank shaft 56 and the electric motor shaft 59 are disposed in the longitudinal direction (fore and aft) of the vehicular body, it is possible to facilitate the layout of the equipment.

The present invention may be also applied to a motorcycle using a gasoline engine as a drive source.

INDUSTRIAL APPLICABILITY

The present invention having the above arrangement achieves the following advantages:

In one aspect of the present invention, since the crank shaft and the power transmission system are disposed on one side and the cylinder head is disposed on the other side, it is possible to improve the weight balance of the power unit, and hence to ensure a favorable steering stability of the motorcycle.

In another aspect of the present invention, since the crank shaft and the power transmission system are disposed on one side and the cylinder head including a valve drive mechanism is disposed on the other side, it is possible to improve the weight balance of the power unit, and hence to ensure a favorable steering stability of the motorcycle.

In a further aspect of the present invention, since the power transmission system including the electric motor and the crank shaft disposed on one side and the cylinder head is disposed on the other side, it is possible to improve the weight balance of the power unit, and hence to ensure a favorable steering stability of the motorcycle.

In a still further aspect of the present invention, since the crank shaft and the power transmission system are disposed on one side, and the cylinder head and members of the intake and exhaust system are disposed on the other side, it is possible to improve the weight balance of the power unit, and hence to ensure a favorable steering stability of the motorcycle.

What is claimed is:

1. A power unit arrangement structure for a motorcycle, said motorcycle having a body and a main frame, said power unit arrangement structure comprising a power unit including an engine, an electric motor, and a power transmission system, said power transmission system for transmitting power of said engine and for transmitting power of this electric motor and being disposable on one side of a rear wheel of the motorcycle, said engine being disposed with a crank shaft extending longitudinally of said body, said power unit arrangment structure further including means for mounting said power unit to said main frame of said motorcycle so that said crank shaft and said power transmission system are disposable on one side with respect to a longitudinal center of said motorcycle body and a cylinder head of the engine extends on the other side with respect to the longitudinal center, said power transmission shaft being disposed parallel to and higher than said crank shaft.

2. A power unit arrangement structure for a motorcycle according to claim 1, wherein said cylinder head is a cylinder head of a four cycle engine.

3. A power unit arrangement structure for a motorcycle according to claim 1 or 2, wherein said mounting means supports members of an intake, system and members of an exhaust system disposed on said cylinder head side.

* * * * *